United States Patent
Mengshoel et al.

(10) Patent No.: US 6,856,680 B2
(45) Date of Patent: *Feb. 15, 2005

(54) CONTACT CENTER AUTOPILOT ALGORITHMS

(75) Inventors: Ole J. Mengshoel, Newport Beach, CA (US); Ken Fertig, Palo Alto, CA (US); Sudhakar Reddy, Santa Clara, CA (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 458 days.

This patent is subject to a terminal disclaimer.

(21) Appl. No.: 09/961,875

(22) Filed: Sep. 24, 2001

(65) Prior Publication Data

US 2003/0095652 A1 May 22, 2003

(51) Int. Cl.[7] .......................... G06F 17/60; H04M 3/523
(52) U.S. Cl. .......................... 379/265.06; 379/265.05; 379/265.13; 705/9
(58) Field of Search .................. 379/265.01, 265.02, 379/265.03, 265.04, 265.05, 265.06, 265.07, 265.08, 265.1, 265.11, 265.12, 265.13, 265.14; 705/8, 9, 10

(56) References Cited

U.S. PATENT DOCUMENTS

| | | | | |
|---|---|---|---|---|
| 5,164,983 A | * | 11/1992 | Brown et al. | 379/265.03 |
| 5,289,368 A | | 2/1994 | Jordan et al. | 705/8 |
| 5,903,641 A | * | 5/1999 | Tonisson | 379/265.12 |
| 6,044,355 A | * | 3/2000 | Crockett et al. | 705/8 |
| 2003/0081757 A1 | * | 5/2003 | Mengshoel et al. | 379/265.06 |

FOREIGN PATENT DOCUMENTS

EP        1 056 264 A2        11/2000        .......... H04M/3/523

* cited by examiner

Primary Examiner—Harry S. Hong
(74) Attorney, Agent, or Firm—Welsh & Katz, Ltd.

(57) ABSTRACT

A method and apparatus are provided for dynamically reassigning agents among call types in a call distribution system having a plurality of agents assigned to a plurality of call types. The method includes the steps of detecting a deficiency in agent responsibility assigned to a call type of the plurality of call types based upon a measured service parameter and corresponding target service parameter and determining an agent allocation among the plurality of call types best suited to correct the deficiency.

50 Claims, 4 Drawing Sheets

CONTACT CENTER AUTOPILOT ALGORITHMS

FIELD OF THE INVENTION

The field of the invention relates to telephony systems and more particularly to automatic call distributors used with private networks.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system routes the calls to its agents based upon some algorithm, typically based upon availability. For example, where all agents are considered equal, the automatic call distributor (ACD) may distribute the calls based upon which agent position (telephone) has been idle the longest.

An organization often relies on historical levels (in Erlangs) of incoming calls to the individual call targets in order to staff an ACD. A manager of the ACD may examine the historical call loading records, add or subtract a percentage of the historical loading based upon a most recent call history (e.g., the most recent week or month), and estimate a staffing level based upon those calculations. Alternatively, some organizations have relied upon commercially available predictive software (i.e., work force management packages) that calculate daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group may be separately staffed based upon an Erlang estimate for that group.

As an alternative to staffing individual groups, some systems group all agents together and assign a skill rating to each agent group. Calls are then assigned to the group based upon the skill rating of the agent for handling that type of call.

For example, where a single group is used, an ACD may look for and assign the call to the most qualified agent. As some agents are more qualified than others, some agents will receive more calls than others, resulting in an inequitable work load (i.e., the agent may be regarded as being in a "hot seat").

Further, where all agents are grouped together, Erlang theory for any one group can become inaccurate. For example, one benefit of using a common group relates to economies of scale. Two groups that separately require 10 agents each would typically only require 18 agents if provided from a common pool to maintain the same level of service. On the other hand, some systems which maintain separate groups also share some agents and, therefore, there is some economy of scale due to the sharing. However, neither extreme is typically used exclusively in contact centers.

In contact centers, including call centers, it is difficult to allocate resources, including personnel resources, such that the goals of the contact center business (e.g., average speed of answer, service level, level of abandoned calls, etc.) are met. For example, even in the case where an adequate number of agents are scheduled for work, a change in the call mix may result in a mismatch of skilled agents for a call type.

Where all agents are grouped together and the goals of the contact center business are the same across all applications, staffing estimates can be based upon an Erlang rate of the agent pool as a whole. Basing a staffing estimate upon an organization as a whole is subject to large errors if the agents are not, in fact, grouped together. Because of the importance of call handling through ACDs, the need to route calls to agents according to skill and the goals of the contact center and the dynamic nature of both the incoming traffic and agent availability, a need exists for a method of modifying agent responsibilities among call types which is better than the individual group method.

SUMMARY

A method and apparatus are provided for dynamically reassigning agents among call types in a call distribution system having a plurality of agents assigned to a plurality of call types. The method includes the steps of detecting a deficiency in agent responsibility assigned to a call type of the plurality of call types based upon a measured service parameter and corresponding target service parameter and determining an agent allocation among the plurality of call types best suited to correct the deficiency.

DETAILED DESCRIPTION OF A PREFERRED EMBODIMENT

Figure 1:
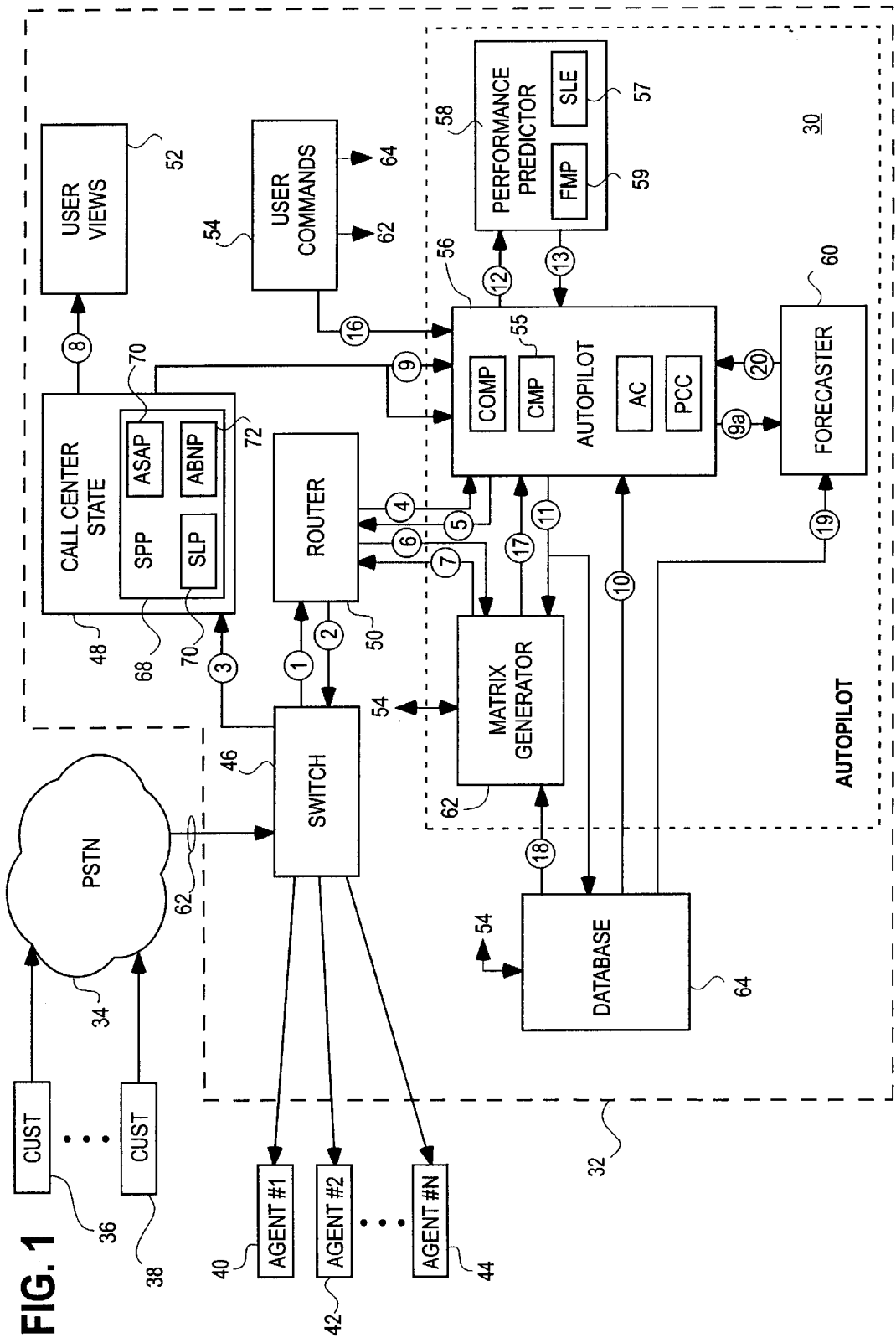
FIG. 1 is a block diagram of the Autopilot (dynamic reassignment engine) under an illustrated embodiment of the invention and in a context of use.

FIG. 1 is a block diagram of an Autopilot 30 under an illustrated embodiment of the invention. The Autopilot may be used to reallocate resources (e.g., agent's time) among call types within an automatic call distributor (ACD).

The architecture of the contact center autopilot 30 of FIG. 1 has the following algorithmic components: allocation algorithm, fast model generation and refinement, and fast model prediction. The allocation algorithm performs the allocation of resources (e.g., personnel) in order to meet the desired performance goals (or objectives), that are recorded in the goals database. Example performance goals are average speed of answer (ASA), service level (SVL), and abandonment rate (ABN). These are specified on an application basis. As part of the resource allocation process, the allocation algorithm uses fast models, and the corresponding fast model prediction component in order to obtain the necessary computational speed. The fast model generation and refinement component creates fast models based on information about historical and estimated future performance of the call center, agent data, and the goals of the contact center.

FIG. 1 depicts the Autopilot System 30 shown in a context of use within an automatic call distributor (ACD) 32. Under the embodiment, the ACD 32 may receive calls over a number of trunk lines 62 through the PSTN 34 from customers 36, 38 of the ACD 32. Along with the calls, the ACD 32 may receive information about the calls from the PSTN 34. For example, the ACD 32 may receive an identifier of a caller from an automatic number identification (ANI) service operating from within the PSTN 34. The ACD 32 may also receive information about a dialed number through a dialed number identification service (DNIS) or direct inward dial (DID) information from the PSTN 34. Information about the call may be derived from the identity of the inbound trunk through which the call arrives.

Alternatively, the call may be answered by the ACD 32 and an auto-attendant (not shown) may be connected to the call. A menu of options may be presented to the caller. Additional call related information may be collected directly from the caller based upon responses provided by the caller to menu options.

From the call associated information (e.g., outgoing call target identity, ANI, DNIS, trunk ID, caller responses, etc.) received from the PSTN 34 (or auto-attendant), the switch 46 may classify the call as a particular work type (or application). For example, the ACD 32 may be owned and operated by a department store. Individual work types may include women's clothing, men's clothing, footwear, house wares, appliances, electronics, furniture, hardware, automotive and garden. Other internal work types may include catalog sales or technical support for one or more of the other call targets.

Responsibility for call handling can be allocated at the level of an individual agent or at the level of multiple agents. For simplicity, but without loss of generality, responsibility for call handling may be allocated directly to agents. Agents are rated according to skill level in each work type. A target agent responsibility (occupancy) matrix is created to allocate portions (i.e., fractions) of agents' time to each of a plurality of work types, based upon the agent skill in handling those work types, as well as work type workload and business goals (or service parameters). Table I is a simplified example of a target occupancy matrix.

TABLE I

|  | Tocc(j) | WORK TYPE #1 | WORK TYPE #2 | WORK TYPE #3 |
|---|---|---|---|---|
| AGENT #1 | 85% | 10% | 60% | 15% |
| AGENT #2 | 50% | 20% | 20% | 10% |
| AGENT #3 | 90% | 30% | 30% | 30% |
| AGENT #4 | 90% | 70% | 10% | 10% |

In the over-staffed situation (agents available when a call arrives), the call is handled by the agent who is the most under-utilized or the least over-utilized. Both under-utilization and over-utilization is based on the notion of actual occupancy. Actual occupancy may be defined as a weighted time average of the amount of time an agent has worked on a particular work type, with the weight being greater the more recent the activity. For example, an exponentially weighted average of actual occupancy over a period (T) would be:

$$AOcc_j(t) = 100 \int_0^T \frac{e^{-a\tau}}{1 - e^{-aT}} U_j(t - \tau) d\tau,$$

where $U_j(s)$ has a value of one if the agent is busy on work type j at time s and zero otherwise.

Table II is an example of an actual occupancy matrix. For each agent, the corresponding cell in the Aocc(j) column sums up the actual occupancy across all work types for the agent. For instance, Agent #1 has Aocc(1)=75% since this particular agent worked 10%, 50%, and 15% on work types #1, #2, and #3 respectively.

TABLE II

|  | Aocc(j) | WORK TYPE #1 | WORK TYPE #2 | WORK TYPE #3 |
|---|---|---|---|---|
| AGENT #1 | 75% | 10% | 50% | 15% |
| AGENT #2 | 49% | 19% | 20% | 10% |
| AGENT #3 | 82% | 27% | 30% | 25% |
| AGENT #4 | 71% | 50% | 10% | 11% |

When a call comes in (e.g., for work type #1) a comparison is made of the deviation of each agent from the target occupancy for that work type. Table III depicts the deviation Docc(j) between Tocc(j) and Aocc(j) for each work type.

TABLE III

|  | Docc(j) | WORK TYPE #1 | WORK TYPE #2 | WORK TYPE #3 |
|---|---|---|---|---|
| AGENT #1 | −10% | 0% | −10% | 0% |
| AGENT #2 | −1% | −1% | 0% | 0% |
| AGENT #3 | −8% | −3% | 0% | −5% |
| AGENT #4 | −19% | −20% | 0% | +1% |

As may be seen by comparing Tables I and II, agent #4 has a target occupancy for work type #1 of 70% and an actual occupancy for work type #1 of 50%. Since agent #4 has the greatest negative deviation (i.e., is the most under-utilized or least overutilized), as shown in Table III, the next call of work type #1 would go to agent #4.

It may be noted in passing that the Docc(j) need not all be negative numbers. For example, agent #4 shows a Docc(j) for work type #3 of +1%. Positive numbers in this context may be taken to mean an overload (e.g., a number of calls per time period) of the call type for a particular agent (e.g., #4).

In the understaffed situation (no agents available and calls are queued), a call will be selected (when an agent becomes available) under a number of different methods. For example, under a first method, the call that has been in a queue the longest may be selected for assignment to an agent who becomes available. Alternatively, the next call may be selected from the queue of a work type that will bring an available agent's actual occupancy level closest to the target for that agent. If there is more than one call of that work type, then the call with the highest priority or the longest time in queue may be chosen.

Alternatively, some combination of time and Docc(j) may be used. For example, if no call has been in a queue for more than 30 seconds then Docc(j) may be used for call selection. If any one or more calls has been in a queue more than 30 seconds, then the call waiting the longest may be selected for assignment to the agent.

The system may be used to provide real-time reporting in the form of a display 52 of actual versus target agent occupancy for each call type, and provides a mechanism for adjusting the target occupancies of individual agents, either manually through the user station (i.e., the PC 54) or automatically under control of the Autopilot. This solution has the advantage that it gives call center management, working through the PC 54 (hereinafter referred to as the "user"), a mechanism for easy control over agent assignments in the form of target occupancies, and it provides a predictable agent utilization where desired.

Under the illustrated embodiment, each agent is evaluated and assigned a skill level for his proficiency in any number of skills related to servicing calls. An agent may be assigned a skill level expressed as any number between 0 and 10 (i.e., where 10 indicates the highest level of proficiency, 0 indicates no proficiency), in increments of 1. Table IV is an example of a skill matrix that may be used to classify agents.

TABLE IV

| | ENGLISH | SPANISH | WOMENS CLOTHING | MENS CLOTHING | FOOTWEAR |
|---|---|---|---|---|---|
| AGENT #1 | 1 | 0 | 5 | 9 | 3 |
| AGENT #2 | 9 | 3 | 5 | 1 | 8 |
| AGENT #3 | 5 | 5 | 7 | 2 | 0 |

Agent proficiency may be regarded as one example of semi-permanent data that may be used by the matrix generator 62 to create a target occupancy matrix. Permanent and variable data may also be used.

Permanent data may include a list of skill types required for each work type. A list may also be provided of the work types handled by the ACD 32. A minimum skill level may be specified for each skill that is required for each work type. A priority number may also be provided for each work type.

Variable data may include a target total agent occupancy (Tocc(i)) for each agent i (also referred to below as Total Target Occupancy). For example, an agent may have a target total agent occupancy of 85, 95 or even 100%. Further, the variable data may include one or more target agent occupancies for the particular work types.

Variable data may also include an expected call load for each work type. The expected load may be in arrival rates and service time, the latter perhaps being agent specific. The variable data may also include a list of agents scheduled to work during any time period.

Once the permanent, semi-permanent and variable data have been provided through the PC 54, a matrix generator 62 may form an initial target occupancy matrix. In forming an initial target matrix, the matrix generator 62 must determine whether an agent is qualified to be given an occupancy value for any particular work type within the target matrix.

To determine the suitability of an agent for a work type, the matrix generator 62 may evaluate each agent's qualifications with regard to the work type. Each agent i must possess a skill level that exceeds a minimum level required by the work type. In effect, the skill ASkl(i,k) of agent i for skill k must exceed the skill requirement WSkl(j,k) for work type j in skill k. Further, any particular work type may require a skill set including more than one evaluated skill. Stated differently, for an agent (i) to be assigned to a work type (j), ASkl(i,k)≧WSkl(j,k) for all k.

In the example of Table II, an organization may promote footware in a particular geographic area known to include a large Spanish population using a predetermined telephone number associated with the promotion. Calls to this telephone number would require at least two skills (i.e., the ability to speak Spanish as well as a knowledge of footwear). A minimum skill level may be required in each skill.

The task of the matrix generator 62 is to determine a target occupancy matrix that maximizes the skill match between agent skills and work type needs, while at the same time assigning sufficient resources to each work type and supporting the minimal skill requirements for each work type. One approach for doing this would be to solve the constrained optimization problem using mixed linear/integer programming techniques. The formal optimization problem is presented below.

Optimization Problem P1

For purposes of clarification, the following terms may be used:

c is the cth cluster, c=1, . . . , C,

C is the number of clusters, $E_j$ is the load for the $j^{th}$ worktype in Erlangs, $S_j$ is the service level goal for worktype j, j is the jth worktype, j=1, . . . , J, J is the number of worktypes, $L_{jc}$ is the lower bound on target occupancy for worktype j and cluster c, $n_c$ is the number of agents in cluster c, $N_{Erlang}(s,l)$ is the number of agents required to achieve service level s under load l in Erlangs using Erlang queuing assumptions, $\vec{O}(\vec{T})$ is a function mapping the target occupancies to the set of actual occupancies, $<O_{11}(\vec{T}), \ldots, O_{1C}(\vec{T}), O_{21}(\vec{T}), \ldots, O_{J1}(\vec{T}), \ldots, \vec{O}_{JC}>$, $O_{jc}(\vec{T})$ is a function mapping the target occupancies to the actual occupancy for worktype j and cluster c, $r_c$ is the ratio of cluster specific scaling parameters, $R_c$ is the total responsibility target occupancy for the $c^{th}$ cluster, $S_j(\vec{T})$ is the function mapping target occupancies to the corresponding actual service level for worktype j, $\vec{T}$ is the set of all target occupancies: $<T_{11}, \ldots, T_{1C}, T_{21}, \ldots, T_{J1}, \ldots, T_{JC}>$, $T_{jc}$ is the target occupancy for worktype j and cluster c, $U_{jc}$ is the upper bound on target occupancy for worktype j and cluster c, $\alpha_j$ is the proportionality constant for allocating manpower to worktype j, $\beta_j$ is the proportionality constant for taking manpower from worktype j, $\Delta N_j^{Erlang}(S_j^{(2)}, S_j^{(1)})$ is the mismatch between needed manpower to achieve service level goal, $S_j^{(2)}$, and the manpower needed to achieve service level, $S_j^{(1)}$ for the $j^{th}$ worktype under Erlang queuing assumptions, $\Delta T_{jc}$ is the amount of change in target occupancy for the $j^{th}$ worktype and $c^{th}$ cluster, $\gamma_c$ is a cluster-scaling parameter used to allocate manpower to understaffed worktypes, and $\eta_c$ is a cluster-scaling parameter used to allocate manpower to overstaffed worktypes.

Given weight factor f, find target occupancy matrix T to minimize ϕ(T), where ϕ(T)=fM$_s$(T)+(1−f) M$_D$(T), subject to $$C1: \sum_{j=1}^{J} T_{ij} = \rho_i, \quad i = 1 \ldots I$$

$$C2: \sum_{i=1}^{I} T_{ij} \geq W_j, \quad i = 1 \ldots I, \quad j = 1 \ldots J,$$

and

C3: $0 \leq T_{ij} \leq U_{ij}$, i=1 . . . I, j=1 . . . J.

Here M$_s$ is a metric that measures the benefits of a good skill assignment, and MD measures the reduction in queues due to sharing workload among many agents. The Contact Center manager can choose the factor, f, to trade off these perhaps competing needs. The next subsection describes these metrics in more detail.

Other ways to solve the problem of developing the target occupancy matrix, T, include alternative optimization formulations, where the hard constraints C1, C2 are relaxed by putting weighted forms of them in the objective function or by resorting to general search strategies such as iterative repair.

Once the initial target occupancy matrix is achieved (and periodically updated based upon predicted loading), the matrix generator 62 may transfer the target occupancy matrix to the router 50. As each call is processed, the router 50 may first determine a call type and then select an agent based upon a comparison between the target occupancy matrix and actual occupancy matrix. An identifier of the selected agent may then be transferred from the router 50 to the switch 46, which may then complete the connection between the customer 36, 38 and selected agent 40, 42, 44.

Turning first to operation of the ACD system 32, in general, an explanation of signal flow will be provided. Following the explanation of signal flow, a discussion will be provided of how the Autopilot Engine 56 uses the signal flow to adjust the target occupancy matrix to accommodate changes in call loading and type.

As calls are processed, the switch 46 may detect call arrival events and transfer a record of such events (FIG. 2, message flow #1) to the router 50. For example, the switch 46 may assign a unique call identifier (ID) to each call. Based upon call associated information, the switch 46 may also assign a call type to the call. For each call, the switch 46 may compose a Call Arrival Event message 1 (including call ID and call type) for transfer to the router 50.

The switch 46 may also monitor for and detect abandoned calls. Abandoned calls may be incoming calls where the caller hung-up before it could be connected to an agent or outgoing calls where the called customer hung up before an agent could be connected to the call connection. For each abandonment, the switch 46 may compose a Call Abandon Event message 1 (including call ID and specifics of abandonment) for transfer to the router 50.

The switch 46 may also monitor agent status. As agents sign-on, the switch 46 adds an identifier (ID) of the agent to an active list. As calls are connected to agents, the ID of the agent is added to an unavailable list. As calls with agents are completed, the switch 46 detects call completion and adds the agent ID to the available list. For each change in agent status, the switch 46 may compose an Agent State Change message 1 (including agent ID and new status) for transfer to the router 50.

Upon receiving a Call Arrival Event message 1 from the switch 46, the router 50 may select an agent for assignment to the call (as described above). The router 50 may then transfer a Routing Decision message (FIG. 2, message #2) including call ID and agent ID to the switch 46.

The router 46 may also periodically transfer a Request-AgentStatus message 2 to the switch 46. The switch 46 may respond with an AgentStatus message 1 indicating the current status of a particular agent (or all agents).

The switch 46 may compose and transfer messages 3 to a statistical processor 48 that maintains statistics regarding the state of the call center. Messages 3 may include Call Arrival Events (including call ID and work type), Call Abandon Events (including call ID), Call Handled Events (including call ID), Call Completed Events (including call ID) and Call Held Events (including call ID).

The statistical processor 48 may compose a number of Call Center State messages 8, 9 to the Autopilot Engine 56 for use in reallocating agent responsibility and to display 52 for user viewing. The Call State Messages 8, 9 may include average speed of answer (ASA) for each work type, service level (SVL) for each work type, call percent abandoned by work type, actual agent occupancy by agent and work type, call arrival rate by work type, call handle time by agent and work type, calls currently offered by work type, calls currently queued by work type and calls currently held by work type.

The router 50 may also compose and forward a number of Router to autopilot messages 4. Messages may include Agent Log In Events by agent, Agent Log Out Events by agent, Observed Agent Occupancy by agent and work type, target occupancy changes by agent and work type and Queue Priority Changes by work type.

The Autopilot Engine 56 may compose and transfer a number of Autopilot to Router messages 5. Autopilot to Router messages 5 may include Target Occupancy Changes by agent and work type and Queue Priority Changes by work type.

The Autopilot Engine 56 may also compose and forward a number of Router to Matrix Generator messages 6. The Router to Matrix Generator messages 6 may include Agent Log In Events by agent and Agent Log Out Events by agent.

The matrix generator 62 may compose and forward a number of Matrix Generator to Router messages 7 to the router 50. The Matrix Generator to Router messages 7 may include an Agents List, a Work Type List and an Occupancy Matrix.

The statistics processor 48 may also compose and transfer a number of Call Center State to Forecaster messages 9a through the Autopilot Engine 56. The Call Center State to Forecaster messages 9a may include an Observed Arrival Rate of calls by work type, time-of-day and/or period and an Observed Handle Time by agent, work type and time-of-day and/or period.

The database may compose and transfer a number of Database to autopilot messages 10. The Database to autopilot messages 10 may include Expected Arrival Rate of calls by work type, Expected Handle Time of calls by agent and work type, Agent Skill Level by agent and skill, Required Skill Level by work type and skill, any Agent Restrictions by agent and work type, a Target ASA by agent and work type, a Target SVL by agent and work type and a Target Abandon Rate by agent and work type.

The Autopilot may compose and transfer a number of Autopilot to Matrix Generator messages 11 directed to the matrix generator 62. The Autopilot to Matrix Generator messages 11 may include a first type of messages referred to as a Matrix Generator Control Interface and a second type referred to as Target Occupancy Matrix Changes. Target Occupancy Matrix Changes messages may include matrix change information by agent and work type.

The Matrix Generator Control Interface messages may include changes such as agent log-in/log-out events, configuration updates regarding agents, work types and preferences, updates to individual matrix cells regarding agents and work types, Generate New matrix messages and Commit New Matrix to use messages.

The Autopilot Engine 56 may compose and transfer a number of Autopilot to Performance Predictor messages 12 for transfer to the performance predictor 58. The Autopilot to Performance Predictor messages 12 may include an Agent List, a Cluster List, a Work Type List, an Occupancy Matrix, a Queue Priority List by work type, a Call Arrival Rate by work type, a Handle Time by agent cluster and work type, and a Hold Time by work type. As used herein a Cluster List defines those agents who have identical work assignments within any particular call type.

The performance predictor 58 may compose and transfer a number of Performance Predictor to Autopilot messages 13 based upon proposed changes transferred to the performance predictor 58 from the Autopilot Engine 56. The Performance Predictor to Autopilot messages 13 may include a predicted ASA by work type, a predicted SVL by work type, a predicted Call Percent Abandoned by agent and work type, and a Cluster Utilization by cluster and work type.

Figure 2:
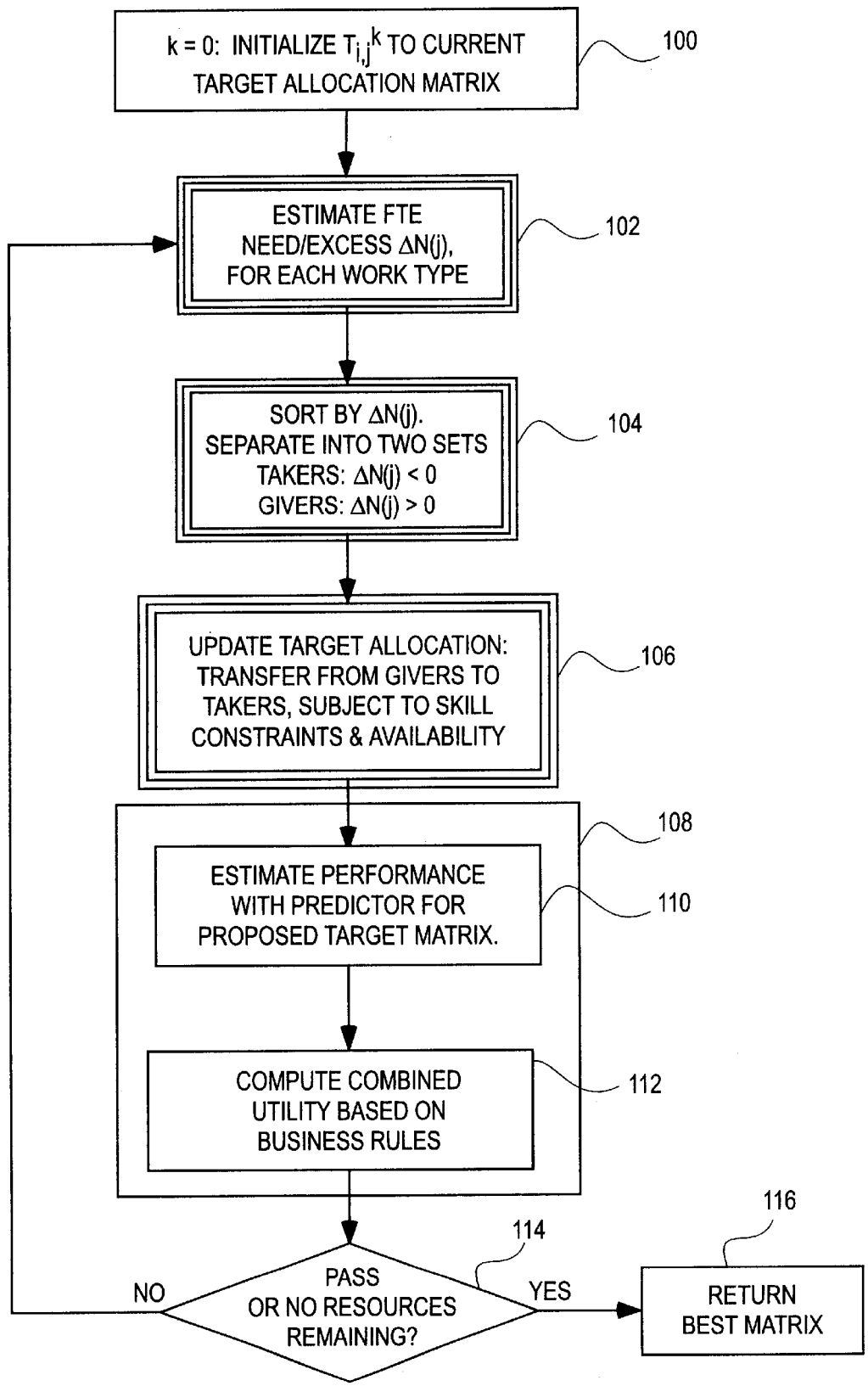
FIG. 2 graphically depicts agent reallocation steps that may be performed by the autopilot of FIG. 1.

The database 64 may also compose and transfer a number of Database to Router messages (not shown in FIG. 2). The Database to Router messages may include a Default Queue Priority List by work type and a set of Router Parameters. The Router Parameters may include a DefaultQueuePriority List, a MaxAgentListSize, a MaxOccupancyList Size, MaxRequestQueueSize, a MaxWorkTypeListSize, a UnderstaffedMode and an OccupancyWindow. The DefaultQueuePriority List may include an ordered default list of priorities among call queues. The MaxAgentListSize may include a maximum number of agents(e.g., 3,000) that may be contained within the occupancy matrices. The MaxOccupancyList may include a maximum number (e.g., 10) of work types permitted by a particular agent. The MaxRequestQueueSize may include a maximum permitted number of queues (e.g., 100).

The database 64 may compose and transfer to the performance predictor 58 a number of Database to Performance Predictor messages (not shown in FIG. 2). The Database to Performance Predictor messages may include a call Hold Time by work type and the set of Router Parameters discussed above. The Hold Time may specify an average length of time calls were held in the respective call queues.

The PC 54 may transfer a number of User Commands to Autopilot messages 16 to the Autopilot Engine 56. The User Commands to Autopilot messages 16 may include agent scheduling information, changes to predicted call loading due to external factors (promotional campaigns), change to default values regarding operation of the ACD 32, etc.

The matrix generator 62 may compose and transfer a number of Matrix Generator to Autopilot messages 17 to the Autopilot Engine 56. The Matrix Generator to Autopilot messages 17 may include a Target Occupancy Matrix and/or an Agent Capability Matrix.

The database 64 may compose and transfer a number of Database to Matrix Generator messages 18. The Database to Matrix Generator messages 18 may include a skills list, agent limitations list, work type parameters and preferences. The agent limitations list may include agent ID, Total Target Occupancy for the agent, Primary Responsibility Work Type for the agent, Primary Occupancy for the agent, Skill Level by skill and Allowed Work Types by agent.

The Work Type Parameters List may include work type ID, an Expected Workload, a Staffing Priority and a Required Skill Level for each work type.

The Preferences List may include a number of default values that may be changed by a user. The values may include a DefaultTargetOccupancy, MinOccupancyValue, MaxOccupancy, MinWorkTypesPerAgent, MaxWorkTypesPerAgent, NumberOfFineTuneIterations, NumberOfIterations, OccupancyDelta, PrimaryResponsibilityValue, UsePrimaryResponsibilities (flag), WeightFTE, WeightSkills, GenerationThreshold, FineTune(flag), and FineTuneIgnoreScore(flag).

The database 64 may compose and transfer a number of Database to Forecaster messages 19. The Database to Forecaster messages 19 to the forecaster 60 may include an expected call arrival rate by work type, time-of-day and/or period, expected handle time of a call by agent, work type, time-of-day and/or period and Historical Call Traffic by work type by work type, time-of-day and/or period.

The forecaster 60 may compose and transfer a number of Forecaster to Autopilot messages 20. The Forecaster to Autopilot messages 20 may include a Forecasted Arrival Rate by work type, time-of-day and/or period and a Forecasted Handle Time by agent, work type, time-of-day and/or period.

The Autopilot Engine 56 may compose and transfer a number of Autopilot to User View messages 21. Autopilot to User View messages 21 may include autopilot performance information (e.g., historical versus actual call arrival rates, historical agent performance versus actual performance, etc.).

Once the initial target occupancy matrix is achieved, the Autopilot Engine 56 may also begin to change the matrix (via a search process) by reallocating agent target responsibilities (or portions of agent responsibilities as required). As used in conjunction with the Autopilot Engine 56, the term "search process" means the creation of a plurality of alternative fractional agent reallocations (agent allocation scenarios) and the selection and execution of one of the reallocations based upon some predetermined criteria. The search for a new matrix may be performed continuously to accommodate business rule issues or periodically based upon some objective service standard (e.g., average speed of answer (ASA), service level (SVL), abandonment rate (ABN), etc.). Where the search is performed periodically, the process may begin and continue for a fixed number of cycles specified by the user.

As a first step in the update process, the Autopilot Engine 56 may compute another service related parameter, called an autopilot objective function value for purposes of evaluating agent allocation scenarios. In general, the matrix generator 62 generates an initial target occupancy matrix. Once the initial target occupancy matrix has been generated, the Autopilot engine 56 may assume control of maintaining and updating the target occupancy matrix.

The autopilot objective function value may differ from the objective function value used by the Matrix Generator 62 in that the autopilot objective function value may be more concerned with tracking call center service parameters (e.g., service level, average speed of answer, abandonment rate, etc.) while maintaining sufficient skill assignments. In contrast, the matrix generator objective function value may be used to generate the initial target occupancy matrix which may emphasize skill match and total call volume issues, with less emphasis put on service parameter estimation.

For example, a ratio of realized service level $SVL_j^{realized}$ to desired service level $SVL_j^{desired}$ may be used as the objective function value. The objectives of many call types may be achieved to provide a combined utility using penalty weights $W_{penalty}$ and reward weights $W_{reward}$ within a combined utility processor 55 based upon the equation as follows:

$$U_{total} = w_{reward} \sum_{j \in Wtype_{abundant}} (SVL_j^{realized} / SVL_j^{desired} - 1) + w_{penalty} \sum_{j \in Wtype_{deficient}} (SVL_j^{realized} / SVL_j^{desired} - 1)$$

The autopilot objective function value provides a means of evaluating a proposed new alternative agent reallocation over other proposed alternative agent reallocations. The value of the autopilot objective function may be determined by calculating how well the call center meets its business goals as determined by the magnitude of its service parameters (e.g., ASA, SVL, ABN, a weighted combination of ASA, SVL and ABN, etc.). From a number of alternative resource allocations, the autopilot objective function with the highest value may be chosen.

Further, the Autopilot System 30 may incorporate a look-ahead capability based upon information transferred from the forecaster 60. For example, a currently experienced call service level and currently experienced call arrival rate may be determined by a service level processor and call arrival processor of the Call Center State 48. From the assigned available equivalent full time agents, service level and call arrival rate, any excess capacity or deficiency in capacity among the call types (or the ACD 32 as a whole) may be determined. Additionally, the actual call arrival rate may be adjusted upwards or downwards by the forecaster 60 to provide a predicted call arrival rate. From the predicted call arrival rate, any excess or deficiency in staffing may be anticipated and compensated for in the evaluation of reallocation of agent responsibilities.

Figure 3:
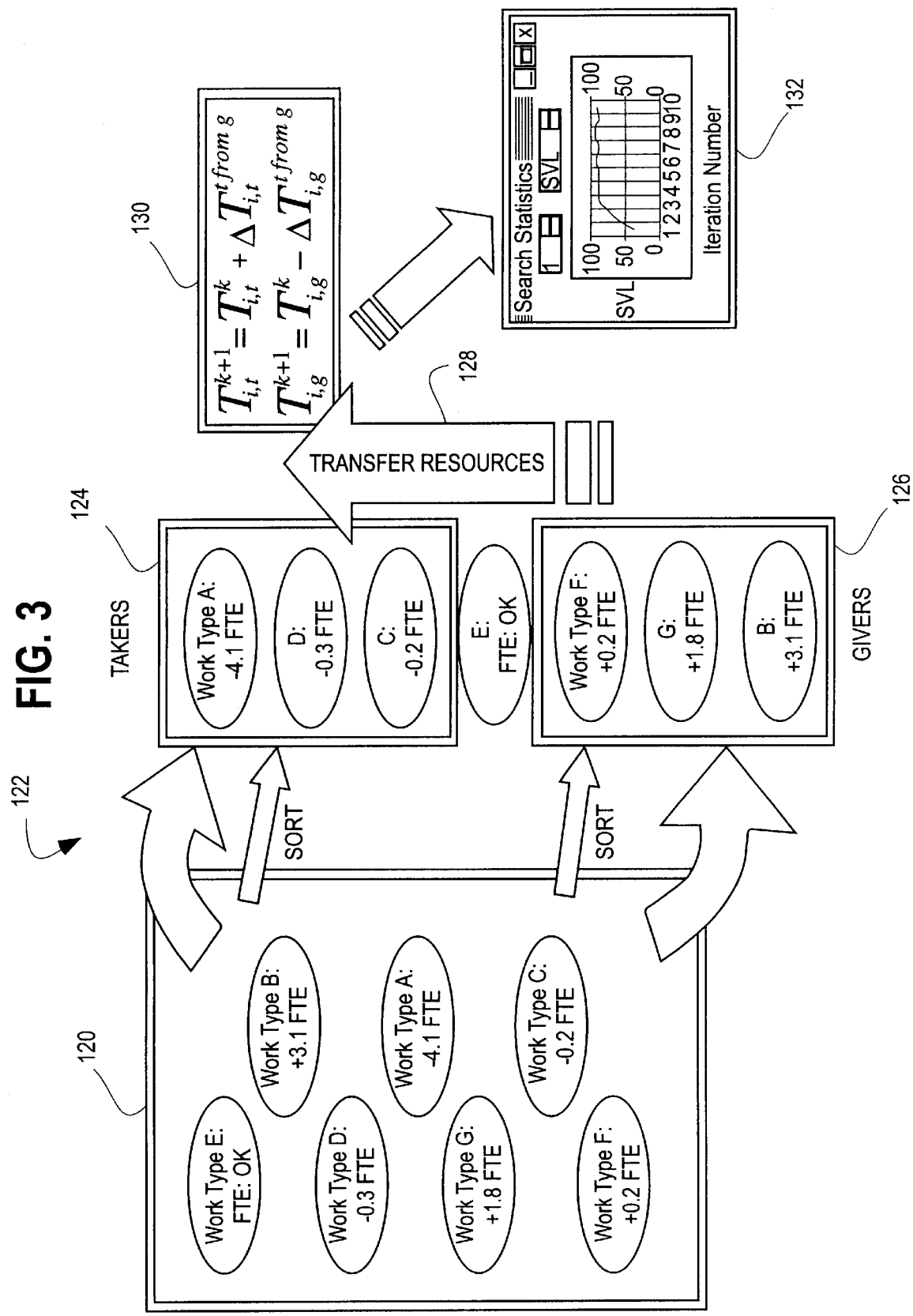
FIG. 3 is a flow chart of agent reallocation steps that may be performed by the autopilot of FIG. 1.

To generate agent allocation scenarios directed to correcting any perceived deficiency in agent allocation, a number of search strategies may be used. FIG. 2 is a flow chart which shows the steps used to determine the best allocation of agents. FIG. 3 illustrates the process of FIG. 2 under a graphical format.

Figure 4:
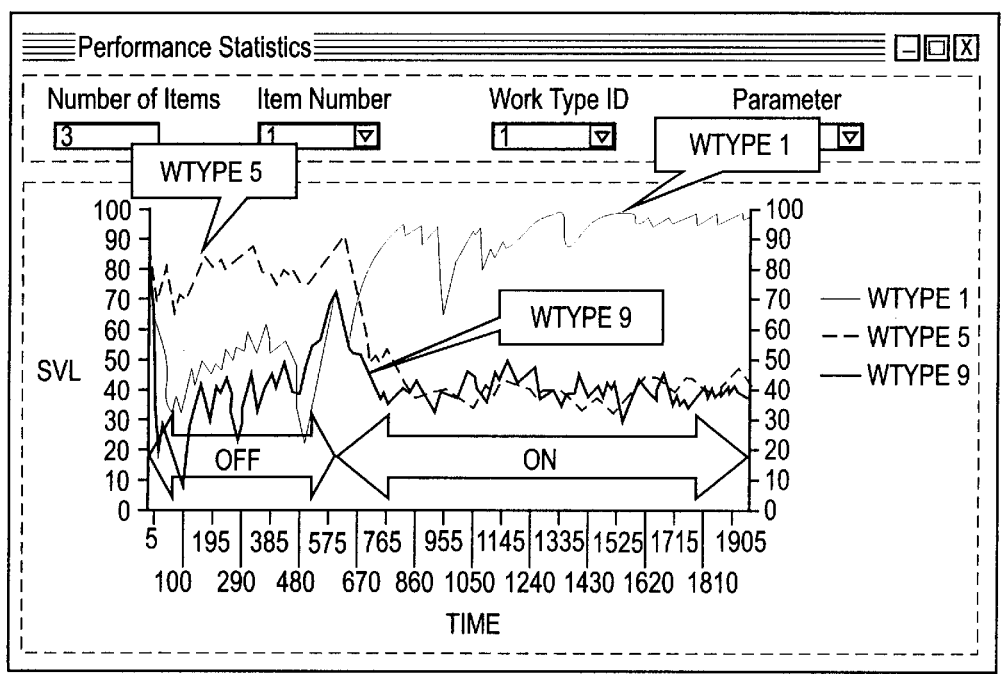
FIG. 4 depicts service level for three work types with the autopilot activated and deactivated.

FIG. 4 depicts an example of the effects produced by the Autopilot System 30. The data of FIG. 4 was collected from a workstation having 145 agents sharing the workload on 12 different applications requiring different skill levels. FIG. 4 depicts a service level rating for three of the 12 applications (i.e., Wtype1, Wtype5 and Wtype9). The goals were set of 95% for Wtype1, 40% for Wtype5 and 40% for Wtype9. Agent assignment to worktypes was random.

During the first ten minutes (i.e., from 0 to 600 seconds), the service levels were allowed to be determined by the incoming call loading. During the following 20 minutes (i.e., from 600 seconds to 1905 seconds), the Autopilot System 30 was activated. As may be noted, the SVL of Wtype1 increased significantly, consistent with its service level goal. The SVLs of Wtype5 and Wtype9 decreased significantly, also consistent with their goals. As may be noted from FIG. 4, the use of the Autopilot System 30 allows a manager of a call center to set priorities for call answering that (up to the limit of the resources available within the call center) is independent of call loading.

In the following generalization, C clusters of agents are considered. Each cluster has $n_C$ agents in the cluster where $c = 1, \ldots, C$. It is required that all of the agents in a given cluster have identical target responsibilities for each work type. The clustering of agents reduces the number of parameters that have to be determined. In general, each allocation of target occupancies $\vec{T}$ may have the form: $\vec{T} = <T_{11}, \ldots, T_{1C}, T_{21}, \ldots, T_{J1}, \ldots, T_{JC}>$, where J is the number of worktypes and where C is the number of clusters in a particular worktype. Allowing $n_C$ to equal 1 allows the problem to be simplified to that of identifying a target responsibility allocation for each agent.

For fixed arrival and service rates, the allocation $\vec{T}$ will give rise to a set of observed occupancies $\vec{O}(\vec{T})$ as follows:

$$\vec{O}(\vec{T}) = <O_{11}(\vec{T}), \ldots, O_{1C}(\vec{T}), O_{21}(\vec{T}), \ldots, O_{J1}(\vec{T}), \ldots, O_{JC}(\vec{T})>,$$

and observed service levels $\vec{S}(\vec{T})$ and workloads $\vec{E}(\vec{T})$. The observed service levels $\vec{S}(\vec{T})$ and workloads $\vec{E}(\vec{T})$ may have the form $\vec{S}(\vec{T}) = <S_1(\vec{T}), \ldots, S_J(\vec{T})>$ and $\vec{E}(\vec{T}) = <E_1(\vec{T}), \ldots, E_J(\vec{T})>$, where the workloads, $E_j$, in Erlangs, satisfy the expression, $$E_j = \sum_{c=1}^{C} O_{jc}(\vec{T}) n_c$$

and are invariant with respect to changes in $\vec{T}$. In general, the actual service level for any worktype, j, depends upon the entire target allocation, $\vec{T}$, not just the worktype-specific portion of $\vec{T}$. In addition, other service parameters, such as average speed of answer ASA($\vec{T}$) or abandonment rate ABN($\vec{T}$), or some combination of service parameters could also be used in place of or in conjunction with $S(\vec{T})$.

For each worktype, there may be an associated full time equivalent (FTE) workforce $N_j$, that may be defined by the expression $$N_j = \sum_{c=1}^{C} T_{jc} n_c.$$

Corresponding to each service level, $S_j$, and load, $E_j$, there is an equivalent workforce $N_j^{Erlang,S_j}$ that would achieve that service level in a separate, single queue, Erlang system. The workforce may be described by the expression $N_j^{Erlang,S_j} = N_{Erlang}(S_j, E_j)$.

In general, $N_j$ does not equal $N_j^{Erlang, S_j}$. More specifically, the difference is a weak function of the arguments of the respective functions. However, because the autopilot 56 executes relatively small changes in target occupancies, the error of assuming that $N_j$ does equal $N_j^{Erlang,S_j}$ is also relatively small and, in fact has been found to be significantly smaller than the absolute error that would otherwise be experienced between an Erlang single-queue model and a multiple queue, complex routing problem. The error may be reduced further by certain predetermined heuristic rules for each worktype that relates net changes in service level to fractional changes in FTEs.

As a first step in determining a new target occupancy, the autopilot 56 may initialize 100 (FIG. 3) the target occupancies $T_{i,j}^k$ to a current target allocation matrix. The autopilot 56 may then determine 102 an excess or deficiency for each work type. This may be determined by comparing the number of agents required to achieve the worktype goals under Erlang queuing versus the number required to achieve the service level under the same set of assumptions. This process may be characterized by the expression $\Delta N_j^{Erlang}(G_j,S_j)=N_{Erlang}(G_j,E_j)-N_{Erlang}(S_j,E_j)$, $G_j$ is a service level goal and $S_j$ is an observed service level. Applying this process to each worktype may result in a list 120 of excess or deficient full time equivalent (FTE) agents for each worktype.

Once the number of excess or deficient FTE agents has been determined, the call types may be divided 102, 122 into givers and takers. Two ordered lists 124, 126 may be created. A first list 126 of givers may be of call types with excess capacity (business goals are exceeded). A second list of takers 124 may be of call types with deficient capacity (business goals are not met).

From the ordered lists, call types with excess capacity may be correlated with call types with deficient capacity. Agent responsibility (or clusters of agent responsibilities) may be reapportioned, from the work type with the greatest excess capacity for transfer to the call type with the greatest deficiency.

Selection of call types with the greatest excess and deficiency may be used as a method to reduce fractional assignments. However, any other method could also be used.

For example, agents with similar skills may be clustered based on responsibility. The work allocation of an entire cluster may then be modified to meet new loads or new goals. Alternatively, agents may be moved between clusters by adjusting an agents work allocation to another cluster's requirements and adding that agent to the cluster.

All or a portion of the selected agent's occupancy may be transferred from the work type with the excess capacity to the work type with the deficiency in capacity. If the service parameter used as a basis for reallocation is service level, then the alternative reallocation selected may be the one which most closely matches a projected call arrival rate with a projected service level specified in the business rules for the two call types.

From the call types with the greatest deficiency and excess capacity, the Autopilot Engine 56 may proceed to the call types with the less excess capacity and deficiency. The Autopilot Engine 56 may step through each call type of the two ordered lists matching excess to deficiency.

In the example of FIG. 2, during the first iteration, a proportion of a giver worktype (e.g., B) may be transferred 128 to a taker worktype (e.g., A). Based upon the transfers 130 a target allocation matrix may be updated 106 subject to the skill constraints and availability of agents.

The updated target allocation matrix may be transferred to a performance predictor 58 (labeled 108 in the flow chart of FIG. 3). Within the performance predictor 108, an estimated performance (e.g., SVL) may be estimated 110 within a service level estimator 57 for each worktype. A combined utility may be computed 112 (e.g., as discussed above for SVL using the penalty and reward weights).

The combined utility of the proposed target matrix may be compared 114 with a threshold value within a comparator to determine whether to place the proposed agent allocation scenario into production. If the combined utility does not exceed the threshold value for a minimum combined utility, then a new agent reallocation scenario including an estimated FTE agent list 120 may be created from the proposed target occupancy matrix and the process may be repeated. If the combined utility does exceed the threshold then the agent allocation scenario may be placed into production.

Turning now to the performance predictor 58, a number of examples will be provided of fast modeling methods used within a fast modeling processor 59 that may be used for selection of an agent reallocation scenario. Under a first example, a neural network may be used for the fast modeling of transfers among call types. Training of the neural network may be based on randomly selecting agents from the call types with excess capacity and transferring all or a portion of the selected agent time to one or more call types with deficient capacity. As each transfer is made, the impact upon the relevant service parameter may be measured, recorded, and subsequently used for learning. The measured value of the service parameter may then be used to adjust a set of weights within the neural network to reflect the impact of the transfer of the selected agent upon both source and destination call types.

Under a second example, discrete event simulation may be used for the performance predictor 58. As above, the method of discrete event simulation used may be adapted to the characteristics of the ACD 32. Discrete event simulation may be run in parallel on several computers in order to speed up processing.

Under a third example, curve-fitting routines, such as non-linear regression, may be used for fast modeling in the performance predictor 58.

As discussed above, agents from call types with excess capacity may be reallocated to call types with insufficient capacity. Using the models outlined above, the efficacy of any set of proposed changes towards balanced loading may be evaluated quickly.

For example, a first alternative reallocation proposal may be achieved by balancing the excess agents from the call types with excess capacity with the call types with deficient capacity. This may be done by assigning agents from the call types with greatest excess capacity to call types with greatest deficiency and so on. Using the fast modeling methods any excesses or deficiencies between predicted call arrival rate and predicted service levels among the call types may be balanced among the call types using an allocation controller operating within the Autopilot Engine 56.

In order to evaluate the impact of the proposed changes on the performance of the ACD 32, the performance predictor 58 may calculate a change in the performance criteria. Impact may be determined based upon the calculated objective function value and/or upon a calculated change in the selected service parameter. Where based upon the selected service parameter, the criteria for acceptance of a proposal best suited to correct the deficiency may be that the predicted selected service parameter for each call type fall within a business rule value for that call type. Where based upon the autopilot objective function value, the criteria may be that the chosen proposal provides the lowest relative value for the objective function value.

The Autopilot Engine 56 may calculate the change in the selected service parameter directly. A comparator operating within the Autopilot Engine 56 may compare the calculated parameter(s) and select the proposal with the greatest improvement. The proposal providing the greatest improvement in performance may be automatically selected by the Autopilot Engine 56.

Once a proposal (i.e., a new target occupancy matrix) is selected, the Autopilot Engine 56 may transfer the proposed changes to the matrix generator 62 and router 50. Once transferred to the router 50, agents may immediately be assigned based upon the new target occupancy matrix.

A specific embodiment of a method and apparatus for an improved skill-based call routing system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A method of dynamically reassigning agent responsibility among call types in a call distribution system having a plurality of agents assigned to a plurality of call types, such method comprising the steps of:

detecting a deficiency in agent responsibility assigned to a call type of the plurality of call types based upon a measured service parameter and corresponding target service parameter;

creating a plurality of alternative agent allocation scenarios based upon a search process; and determining an agent allocation among the plurality of call types best suited to correct the deficiency from among the created plurality of alternative agent allocation scenarios.

2. The method of dynamically reassigning agent responsibility among call types as in claim 1 wherein the step of determining the agent allocation among the plurality of call types best suited to correct the deficiency further comprises predicting a performance of each of a plurality of agent reallocation scenarios.

3. The method of dynamically reassigning agent responsibility among call types as in claim 2 wherein the step of predicting the performance of each of the plurality of agent reallocation scenarios further comprises using a single queue Erlang model to approximate the agent allocation best suited to correct the deficiency.

4. The method of dynamically reassigning agent responsibility among call types as in claim 1 wherein the step of detecting a deficiency further comprises measuring a service parameter for at least some call types of the plurality of call types.

5. The method of dynamically reassigning agent responsibility among call types as in claim 4 wherein the step of detecting a deficiency further comprises comparing the measured service parameter with the target service parameter.

6. The method of dynamically reassigning agent responsibility among call types as in claim 5 wherein the step of determining an agent allocation among the plurality of call types best suited to correct the deficiency further comprises estimating a service parameter of each of the plurality of call types for each of a plurality of alternative agent reallocation scenarios.

7. The method of dynamically reassigning agent responsibility among call types as in claim 6 wherein the step of estimating the service parameter for each of the plurality of call types further comprises calculating a combined utility among the estimated service parameter for each of the plurality of alternative agent reallocation scenarios.

8. The method of dynamically reassigning agent responsibility among call types as in claim 1 wherein the step of detecting a deficiency further comprises measuring an average speed of answer for at least some call types of the plurality of call types.

9. The method of dynamically reassigning agent responsibility among call types as in claim 8 wherein the step of detecting a deficiency further comprises comparing the measured average speed of answer with a threshold value.

10. The method of dynamically reassigning agent responsibility among call types as in claim 9 wherein the step of determining an agent allocation among the plurality of call types best suited to correct the deficiency further comprises estimating an average speed of answer of each of the plurality of call types for each of a plurality of alternative agent reallocation scenarios.

11. The method of dynamically reassigning agent responsibility among call types as in claim 10 wherein the step of estimating the service parameter for each of the plurality of call types further comprises calculating a combined utility among the estimated average speed of answer for each of the plurality of alternative agent reallocation scenarios.

12. The method of dynamically reassigning agent responsibility among call types as in claim 1 wherein the step of detecting a deficiency further comprises measuring a call abandonment rate for at least some call types of the plurality of call types.

13. The method of dynamically reassigning agent responsibility among call types as in claim 12 wherein the step of detecting a deficiency further comprises comparing the measured abandonment rate with a threshold value.

14. The method of dynamically reassigning agent responsibility among call types as in claim 13 wherein the step of determining an agent allocation among the plurality of call types best suited to correct the deficiency further comprises estimating an abandonment rate of each of the plurality of call types for each of a plurality of alternative agent reallocation scenarios.

15. The method of dynamically reassigning agent responsibility among call types as in claim 14 wherein the step of estimating the service parameter for each of the plurality of call types further comprises calculating a combined utility among the estimated abandonment rates for each of the plurality of alternative agent reallocation scenarios.

16. The method of dynamically reassigning agent responsibility among call types as in claim 1 wherein the step of determining the agent allocation further comprises reallocating a fractional portion of an agent's time from a first call type to a second call type of the plurality of call types.

17. The method of dynamically reassigning agent responsibility among call types as in claim 1wherein the step of determining an agent allocation best suited to correct the deficiency further comprises identifying an agent allocation scenario providing a largest relative number of calls handled per time period.

18. An apparatus for dynamically reassigning agent responsibility among call types in a call distribution system having a plurality of agents assigned to a plurality of call types, such apparatus comprising:

means for detecting a deficiency in agent responsibility assigned to a call type of the plurality of call types based upon a measured service parameter and corresponding target service parameter;

means for creating a plurality of alternative agent allocation scenarios based upon a search process; and means for determining an agent allocation among the plurality of call types best suited to correct the deficiency from among the plurality of alternative agent allocation scenarios provided by the means for creating.

19. The apparatus for dynamically reassigning agent responsibility among call types as in claim 18 wherein the means for determining the agent allocation among the plurality of call types best suited to correct the deficiency further comprises means for predicting a performance of each of a plurality of agent reallocation scenarios.

20. The apparatus for dynamically reassigning agent responsibility among call types as in claim 19 wherein the means for predicting the performance of each of the plurality of agent reallocation scenarios further comprises means for using a single queue Erlang model to approximate the agent allocation best suited to correct the deficiency.

21. The apparatus for dynamically reassigning agent responsibility among call types as in claim 18 wherein the means for detecting a deficiency further comprises means for measuring a service parameter for at least some call types of the plurality of call types.

22. The apparatus for dynamically reassigning agent responsibility among call types as in claim 21 wherein the means for detecting a deficiency further comprises means for comparing the measured service parameter with the target service parameter.

23. The apparatus for dynamically reassigning agent responsibility among call types as in claim 22 wherein the means for determining an agent allocation among the plurality of call types best suited to correct the deficiency further comprises means for estimating a service parameter of each of the plurality of call types for each of a plurality of alternative agent reallocation scenarios.

24. The apparatus for dynamically reassigning agent responsibility among call types as in claim 23 wherein the means for estimating the service parameter for each of the plurality of call types further comprises means for calculating a combined utility among the estimated service parameter for each of the plurality of alternative agent reallocation scenarios.

25. The apparatus for dynamically reassigning agent responsibility among call types as in claim 18 wherein the means for detecting a deficiency further comprises means for measuring an average speed of answer for at least some call types of the plurality of call types.

26. The apparatus for dynamically reassigning agent responsibility among call types as in claim 25 wherein the means for detecting a deficiency further comprises means for comparing the measured average speed of answer with a threshold value.

27. The apparatus for dynamically reassigning agent responsibility among call types as in claim 26 wherein the means for determining an agent allocation among the plurality of call types best suited to correct the deficiency further comprises means for estimating an average speed of answer of each of the plurality of call types for each of a plurality of alternative agent reallocation scenarios.

28. The apparatus for dynamically reassigning agent responsibility among call types as in claim 27 wherein the means for estimating the service parameter for each of the plurality of call types further comprises means for calculating a combined utility among the estimated average speed of answer for each of the plurality of alternative agent reallocation scenarios.

29. The apparatus for dynamically reassigning agent responsibility among call types as in claim 18 wherein the means for detecting a deficiency further comprises means for measuring a call abandonment rate for at least some call types of the plurality of call types.

30. The apparatus for dynamically reassigning agent responsibility among call types as in claim 29 wherein the means for detecting a deficiency further comprises means for comparing the measured abandonment rate with a threshold value.

31. The apparatus for dynamically reassigning agent responsibility among call types as in claim 30 wherein the means for determining an agent allocation among the plurality of call types best suited to correct the deficiency further comprises means for estimating an abandonment rate of each of the plurality of call types for each of a plurality of alternative agent reallocation scenarios.

32. The apparatus for dynamically reassigning agent responsibility among call types as in claim 31 wherein the means for estimating the service parameter for each of the plurality of call types further comprises means for calculating a combined utility among the estimated abandonment rates for each of the plurality of alternative agent reallocation scenarios.

33. The apparatus for dynamically reassigning agent responsibility among call types as in claim 19 wherein the means for predicting the agent allocation further comprises means for reallocating a fractional portion of an agent's time from a first call type to a second call type of the plurality of call types.

34. The apparatus for dynamically reassigning agent responsibility among call types as in claim 19 wherein the means for predicting an agent allocation best suited to correct the deficiency further comprises means for identifying an agent allocation scenario providing a largest relative number of calls handled per time period.

35. An apparatus for dynamically reassigning agent responsibility among call types in a call distribution system having a plurality of agents assigned to a plurality of call types, such apparatus comprising:
   a statistics processor adapted to detect a deficiency in agent responsibility assigned to a call type of the plurality of call types based upon a measured service parameter and corresponding target service parameter;
   a matrix generator adapted to create a plurality of alternative agent allocation scenarios based upon a search process; and
   an autopilot for determining an agent allocation among the plurality of call types best suited to correct the deficiency from the plurality of alternative agent allocation scenarios provided by the matrix generator.

36. The apparatus for dynamically reassigning agent responsibility among call types as in claim 35 wherein the autopilot for determining the agent allocation among the plurality of call types best suited to correct the deficiency further comprises a performance predictor adapted to predict a performance of each of a plurality of agent reallocation scenarios.

37. The apparatus for dynamically reassigning agent responsibility among call types as in claim 35 wherein the autopilot further comprises means for using a single queue Erlang model adapted to approximate the agent allocation best suited to correct the deficiency.

38. The apparatus for dynamically reassigning agent responsibility among call types as in claim 35 wherein the statistics processor detecting a deficiency further comprises a service level processor adapted to measure a service parameter for at least some call types of the plurality of call types.

39. The apparatus for dynamically reassigning agent responsibility among call types as in claim 38 further comprising a comparator adapted to compare the measured service parameter with the target service parameter.

40. The apparatus for dynamically reassigning agent responsibility among call types as in claim 39 wherein the autopilot further comprises a performance predictor adapted to estimate a service parameter of each of the plurality of call types for each of a plurality of alternative agent reallocation scenarios.

41. The apparatus for dynamically reassigning agent responsibility among call types as in claim 40 wherein the autopilot further comprises a utility processor adapted to calculate a combined utility among the estimated service parameter for each of the plurality of alternative agent reallocation scenarios.

42. The apparatus for dynamically reassigning agent responsibility among call types as in claim 35 wherein the statistics processor further comprises an average speed of answer processor adapted to measure an average speed of answer for at least some call types of the plurality of call types.

43. The apparatus for dynamically reassigning agent responsibility among call types as in claim 42 further comprising a comparator adapted to compare the measured average speed of answer with a threshold value.

44. The apparatus for dynamically reassigning agent responsibility among call types as in claim 43 wherein the autopilot further comprises a performance predictor adapted to estimate an average speed of answer of each of the plurality of call types for each of a plurality of alternative agent reallocation scenarios.

45. The apparatus for dynamically reassigning agent responsibility among call types as in claim 44 wherein performance predictor further comprises a utility processor adapted to calculate a combined utility among the estimated average speed of answer for each of the plurality of alternative agent reallocation scenarios.

46. The apparatus for dynamically reassigning agent responsibility among call types as in claim 35 wherein the statistical processor further comprises an abandonment processor adapted to measure a call abandonment rate for at least some call types of the plurality of call types.

47. The apparatus for dynamically reassigning agent responsibility among call types as in claim 46 further comprising a comparator adapted to compare the measured abandonment rate with a threshold value.

48. The apparatus for dynamically reassigning agent responsibility among call types as in claim 47 wherein the autopilot further comprises a performance predictor adapted to estimate an abandonment rate of each of the plurality of call types for each of a plurality of alternative agent reallocation scenarios.

49. The apparatus for dynamically reassigning agent responsibility among call types as in claim 48 further comprising a utility processor adapted to calculate a combined utility among the estimated abandonment rates for each of the plurality of alternative agent reallocation scenarios.

50. The apparatus for dynamically reassigning agent responsibility among call types as in claim 35 wherein the autopilot further comprises a target matrix adapted for reallocation of a fractional portion of an agent's time from a first call type to a second call type of the plurality of call types.

* * * * *